United States Patent [19]

Monzen et al.

[11] Patent Number: 5,496,532
[45] Date of Patent: Mar. 5, 1996

[54] PROCESS FOR PRODUCING HYDROGEN PEROXIDE

[75] Inventors: Hiroyuki Monzen; Kazuhiko Hiromoto; Shuji Hirayama; Nobuyuki Kondo; Haruki Ishigami; Yoshimasa Ishimura, all of Kawasaki, Japan

[73] Assignee: Showa Denko K. K., Tokyo, Japan

[21] Appl. No.: 256,603

[22] PCT Filed: Nov. 16, 1993

[86] PCT No.: PCT/JP93/01678

§ 371 Date: Jul. 19, 1994

§ 102(e) Date: Jul. 19, 1994

[87] PCT Pub. No.: WO94/12428

PCT Pub. Date: Jun. 9, 1994

[30] Foreign Application Priority Data

Nov. 20, 1992 [JP] Japan ................................. 4-312168
Feb. 26, 1993 [JP] Japan ................................. 5-038588

[51] Int. Cl.$^6$ ..................................................... C01B 15/01
[52] U.S. Cl. ........................... 423/584; 502/325; 502/339
[58] Field of Search ........................................... 423/584

[56] References Cited

U.S. PATENT DOCUMENTS 4,681,751  7/1987  Gosser ..................................... 423/584
5,236,692  8/1993  Nagashima et al. .................. 423/584

FOREIGN PATENT DOCUMENTS

| 0501265 | 2/1992 | European Pat. Off. | |
| 56-47121 | 11/1981 | Japan | C01B 15/027 |
| 3103310 | 4/1991 | Japan | C01B 15/029 |
| 4238802 | 8/1992 | Japan | C01B 15/029 |
| 4285003 | 10/1992 | Japan | C01B 15/029 |
| 517106 | 1/1993 | Japan | C01B 15/029 |
| 570107 | 3/1993 | Japan | C01B 15/029 |

OTHER PUBLICATIONS

*Catalysis Letters*, vol. 4, 1990, pp. 107 to 112, A. Maeda et al, "Effect of strong metal–support interaction (smsi) on ethylene hydroformylation over niobia–supported catalysts".

*Primary Examiner*—Wayne Langel
*Attorney, Agent, or Firm*—Sughrue, Mion, Zinn, Macpeak & Seas

[57] ABSTRACT

A process for producing hydrogen peroxide, comprising the step of producing hydrogen peroxide catalytically from hydrogen and oxygen in a reaction medium, wherein a platinum-group metal catalyst is used which comprises a platinum-group metal and, supported thereon, a niobium oxide, a mixed oxide of niobium, a tantalum oxide, a mixed oxide of tantalum, a molybdenum oxide or a tungsten oxide.

5 Claims, No Drawings

PROCESS FOR PRODUCING HYDROGEN PEROXIDE

TECHNICAL FIELD

The present invention relates to a process for catalytically producing hydrogen peroxide from hydrogen and oxygen in a reaction medium.

BACKGROUND ART

An anthraquinone process, an electrolytic process, an isopropyl alcohol oxidation process and the like have been known as a process for the production of hydrogen peroxide, and the anthraquinone process has mainly been adopted commercially. In this process, an anthraquinone derivative is reduced and oxidized in a nonaqueous solvent system to produce hydrogen peroxide which is then extracted with water and distilled to give a product. This process is not always ideal for producing hydrogen peroxide due to drawbacks such as complexity of the process or a deterioration in the anthraquinone solution.

In order to solve the above-described problem, a number of proposals have been made on a process for producing hydrogen peroxide directly from hydrogen and oxygen. For example, Japanese Examined Patent Publication (Kokoku) No. 56-47121 proposes a process for producing hydrogen peroxide wherein hydrogen oxide is produced in an aqueous acidic solution in the presence of a catalyst comprising a hydrous silicic acid carrier and 5% palladium supported thereon. In such a reaction system, however, it is difficult to avoid elution of palladium as the catalyst from the carrier, so that the proposed process has a problem of the service life of the catalyst. In U.S. Pat. No. 4,681,751, activated carbon is used as the carrier to prepare a palladium-containing metallic catalyst for the production of hydrogen peroxide. Activated carbon has a high capability of adsorbing palladium, so that the elution can be relatively suppressed. However, the effect attained by this method is not satisfactory. In Japanese Unexamined Patent Publication (Kokai) No. 3-103310, an amino acid exists in a reaction medium to reduce the elution of iron ions from a reactor for the purpose of improving the selectivity of hydrogen to hydrogen peroxide. The effect attained by this method too is not satisfactory. An attempt to improve the selectivity of hydrogen to hydrogen peroxide has been made by using, as the catalyst, carrier, cerium oxide in Japanese Unexamined Patent Publication (Kokai) No. 4-238802, lanthanum oxide in Japanese Unexamined Patent Publication (Kokai) No. 4-285003, crystalline silica or a zeolite having a high silica content in Japanese Unexamined Patent Publication (Kokai) No. 5-17106 or a mixed oxide comprising zirconium oxide and vanadium oxide in Japanese Unexamined Patent Publication (Kokai) No. 5-70107. However, none of the above proposals could provide a catalyst having a performance on a practical level. Further, it is known that in general the selectivity of hydrogen to hydrogen peroxide remarkably lowers with increasing the amount of the catalyst. Moreover, the reaction should be carried out in a system having a hydrogen concentration of not more than 4% from the viewpoint of avoiding an explosion of hydrogen gas. It is known that the catalyst is likely to be oxidized under the above condition to cause a lowering in activity and selectivity.

An object of the present invention is to solve the problems of elution of the platinum-group metal, a lowering in activity and selectivity and the like and to provide a process for producing hydrogen peroxide catalytically in a reaction medium with a high catalytic activity and a high selectivity.

DISCLOSURE OF THE INVENTION

The above-described object of the present invention can be attained by a process for producing hydrogen peroxide, comprising the step of producing hydrogen peroxide catalytically from hydrogen and oxygen in a reaction medium, characterized by using a platinum-group metal catalyst supported on a carrier comprising at least one oxide selected from the group consisting of a niobium oxide, a mixed oxide of niobium, a tantalum oxide, a mixed oxide of tantalum, a molybdenum oxide or a tungsten oxide.

BEST MODE FOR CARRYING OUT THE INVENTION

In the present invention, niobium oxides wherein the valency of niobium is 2 to 5, such as $NbO$, $Nb_2O_3$, $NbO_2$ and, $Nb_2O_5$, are usable as a catalyst carrier. Among them, $Nb_2O_5$ is a stable oxide and hence can be preferably used in the present invention.

Also for tantalum oxides, those wherein the valency of tantalum is 2 to 5, such as $TaO$, $Ta_2O_3$, $TaO_2$ and $Ta_2O_5$, are usable. Among them, $Ta_2O_5$ is a stable oxide and hence can be preferably used in the present invention.

Further, in the present invention, it is also useful to use, as a carrier, a molybdenum oxide or a tungsten oxide. $MoO_3$ may be preferably used as the molybdenum oxide, and $WO_3$ may be preferably used as the tungsten oxide.

The niobium oxide is generally produced by providing as a raw material a solution of a soluble niobium compound, such as a chloride, an alkoxy compound, an oxalate or a tartrate of niobium, and adding an alkali to the solution or subjecting the solution to hydrolysis. A hydrated $Na_2O_5$ composition ($Nb_2O_5 \cdot nH_2O$) is called "niobic acid" and has on its surface both Brønsted acid sites and Lewis acid sites. It is known that heat treatment of niobic acid increases or decreases these acid sites. Therefore, a niobium oxide can be produced by heating niobic acid. However, the niobium oxide used in the present invention is preferably one produced by heat-treating niobic acid at 300° to 700° C. The heat treatment causes the strong acid sites to disappear and the amount of acid to be lowered, so that hydrogen peroxide can be produced with a high selectivity. When the heat treatment temperature is 300° C. or below, the dehydration is so insufficient that the acid point unfavorably reins unremoved. Incidentally, the smaller the number of acid points, the better the results. However, the number of acid points need not be zero. On the other hand, when the heat treatment temperature is 700° C. or above, the specific surface area is reduced. Therefore, both the above oxides are unsuitable for use as a carrier. The heat treatment may be carried out in an air-containing atmosphere, an inert gas atmosphere or a reducing gas atmosphere.

Although the specific surface area of the niobium oxide used in the present invention is not particularly limited, it is preferably not less than 100 m²/g. Since such a niobium oxide can highly disperse the catalyst component therein, it is suitable for use in the process of the present invention.

The niobium oxide used in the prevent invention, as such, can serve as a carrier. Further, dispersions of the niobium oxide in other carriers, preferably $SiO_2$, $Al_2O_3$ and $TiO_2$, may also be suitably used in the present invention. Furthermore, dispersions of other carries in the niobium oxide may also be suitably used in the present invention. For example, the dispersion of the type described above can be prepared by impregnating the carrier with a solution of a soluble compound of niobium or heat-treating a precipitate obtained by hydrolysis of a mixed solution comprising a soluble compound of niobium and a soluble compound of silicon, alumina or titanium, for example, a mixed solution of alkoxy or chlorine compounds. In this case, there is a possibility that the resultant product is a mere mixture of the niobium oxide with $SiO_2$, $Al_2O_3$ or $TiO_2$ or alternatively a compound called a "mixed oxide," thereof. In the present invention, all of these forms are collectively referred to as a "mixed oxide."

The properties of the tantalum oxide are similar to those of the niobium oxide. As with the niobium oxide, the tantalum oxide can be produced from a solution of a soluble tantalum compound. A preferred tantalum oxide can be produced by heating tantalic acid which is a hydrated $Ta_2O_5$ composition ($Ta_2O_5 \cdot nH_2O$). The heat treatment conditions may be the same as those for niobic acid. Incidentally, the heating temperature of tantalic acid too is preferably in the range of from 300° to 700° C.

The tantalum oxide also may be used alone as the carrier. Further, a dispersion of the tantalum oxide in $SiO_2$, $Al_2O_3$ or $TiO_2$ may be suitably used. Furthermore, as with the mixed oxide of niobium, the mixed oxide of tantalum may be prepared for use as the tantalum oxide.

The molybdenum oxide and the tungsten oxide may be any of known and commercially available ones. The use of the molybdenum oxide or tungsten oxide as the carrier provides the same effect as the use of the niobium oxide and the like.

In order to produce hydrogen peroxide catalytically from hydrogen and oxygen according to the present invention, it is necessary to use a platinum-group metal as the catalyst component. The platinum-group element is preferably palladium, platinum or rhodium, particularly preferably palladium.

The amount of the platinum-group metal used is preferably in the range of from 0.1 to 10% by weight, still preferably in the range of from 0.5 to 8% by weight, based on the carrier.

The platinum-group metal may be supported on the carrier by any conventional method. However, in order to produce hydrogen peroxide with a high activity and a high selectivity, it is advantageous for the platinum-group metal to be highly dispersed on the surface of a carrier, such as a niobium oxide, and the particle diameter of the platinum-group metal to be small.

For example, the catalyst may be generally prepared by impregnating a carrier with a solution of a soluble palladium compound and subjecting the impregnated carrier to reduction with hydrogen, hydrazine, an alcohol or the like. Preferably, a niobiumoxide prepared by hydrolysis of a solution of pentaethoxyniobium ($Nb(OEt)_5$) is dried, impregnated with a solution of palladium chloride in hydrochloric acid and subjected to reduction with hydrogen. In this case, the reduction temperature is preferably in the range of from room temperature to 300° C. In the catalyst prepared by this method, the platinum-group metal is highly dispersed on the surface of the niobium oxide, and the particle diameter of the platinum-group metal is small. Further, since the catalyst exhibits acid resistance and oxidation resistance, it does not give rise to a deterioration in catalyst performance derived from elution, oxidation or other unfavorable phenomena of the platinum-group metal, so that a suitable palladium catalyst can be provided.

In the present invention, it is useful to support the platinum-group metal on the carrier by the ion-exchange process. In the ion-exchange process, a hydroxyl group present on the surface of an acid, such as niobic acid or tantalic acid, is ion-exchanged with a platinum-group complex salt to support the catalyst on the carrier.

The platinum-group metal complex salt as a precursor to the platinum-group metal should be such that a platinum-group metal is contained in a cation. For example, $[Pd(NH_3)_4]Cl_2$ (tetraamminepalladium(II) chloride) and $[Pd(C_2H_8N_2)]Cl_2$ (bis(ethylenediamine)palladium(II) chloride) may be suitably used.

Acids useful in the ion-exchange process, such as niobic acid and tantalic acid, have a number of Brønsted acid points. Therefore, these acids used in the ion-exchange process are preferably heat-treated at a temperature in the range of from 100° to 400° C. or not heat-treated. Further, it is suitable for the acid content to be 0.01 mmol/g or more, preferably 0.5 mmol/g or more.

More specifically, a favorable platinum-group metal catalyst can be prepared by the following method. An acid, such as niobic acid, is immersed in an aqueous $[Pd(NH_3)_4]Cl_2$ solution for several hours, and filtration is then carried out. The collected solid matter is washed with water until no chloride ion is detected any more, dried and subjected to reduction with hydrogen. The reduction temperature is preferably in the range of from room temperature to 300° C. Further, it is possible to carry out the reduction by a wet process using a reducing agent such as hydrazine or an alcohol.

The particle diameter of the platinum-group metal of the catalyst thus prepared is in the range of from 1 to 2 nm which is sufficiently smaller than that of a catalyst prepared by the impregnation process using a chloride. Further, the dispersibility is also good. The reason for this is considered as follows. In the ion-exchange process, since an ion-exchange reaction of a hydroxyl group of an acid, such as niobic acid or tantalic acid, with a platinum-group metal complex ion is utilized, the aggregation of the platinum-group metal is less likely to occur. Further, the adsorption between the acid, such as niobic acid or tantalic acid, and the fine platinum-group metal is so strong that the catalyst life can be improved. Thus, a favorable palladium catalyst can be prepared.

The platinum-group catalyst prepared by the ion-exchange process may be further heat-treated at a temperature in the range of from 300° to 700° C. The heat treatment causes the strong acid point to disappear and the acid content to be lowered, so that hydrogen peroxide can be produced with a high selectivity. When the heat treatment temperature is below 300° C., the dehydration is so insufficient that the acid points unfavorably remain unremoved. On the other hand, when it is above 700° C., the specific surface area of the catalyst is reduced. Both the above cases are unfavorable from the viewpoint of catalyst performance. The heat treatment is preferably carried out in an inert gas atmosphere or a reducing gas atmosphere.

The reason why the niobium oxide or the mixed oxide of niobium is useful as a carrier for the platinum-group element has not been elucidated yet.

However, with respect to the formation of a niobium oxide by heating niobic acid, the following mechanism is considered. The niobium oxide having an isopolyacid structure is known to have a layer structure comprising $NbO_6$ as a unit cell. A Pd salt intercalated between layers of niobic acid having a high surface area is reduced to form highly dispersed metallic Pd. Alternatively, a further heat treatment at a high temperature after that gives rise to phase transition of niobic acid to a niobium oxide. This stabilizes the crystal structure, and the acid content is reduced markedly. In this case, it is considered that the highly dispersed Pd too is subjected to a thermal change which reduces the particle diameter range. The stabilization of the niobium oxide structure, the reduction in acid content, the change in Pd particle diameter distribution and other favorable phenomena are considered to improve the oxidation resistance of Pd, which contributes to an improvement in catalyst performance. Furthermore, although fine particles of Pd present around the surface of the carrier is susceptible to oxidation, since Pd within the niobium oxide is mainly present between layers and stabilized, so that such Pd is considered to be less likely to be oxidized in the reaction atmosphere. This is considered to be also true in the case of the tantalum oxide.

In the present invention, hydrogen peroxide is produced catalytically from hydrogen and oxygen using the platinum-group metal catalyst as prepared above using as a carrier an oxide or a mixed oxide of niobium, tantalum, molybdenum or tungsten.

Water is usually suitable as the reaction medium, and a system with various stabilizers added thereto may be applied. Examples thereof include an aqueous hydrochloric acid solution, an aqueous hydrobromic acid solution, an aqueous phosphoric acid solution and an aqueous sulfuric acid solution. Especially, an aqueous hydrochloric acid solution and an aqueous hydrobromic acid solution may be suitably used. Further, it is also possible to suitably adopt, instead of the aqueous hydrochloric acid solution, a solution of a mixture comprising a combination of sodium chloride, potassium chloride or the like as a chloride ion component with sulfuric acid, phosphoric acid or the like as a hydrogen ion component. Furthermore, it is also possible to suitably adopt, instead of the aqueous hydrobromic acid solution, a solution of a mixture comprising a combination of sodium bromide, potassium bromide or the like as a bromide ion component with sulfuric acid, phosphoric acid or the like as a hydrogen ion component. Organic compounds, for example, alcohols, carboxylic acids, amines and acid amides, may be added as a stabilizer to the reaction medium system as long as they do not react with the formed hydrogen peroxide. The concentration of the stabilizer may be in the range of from 0.001 to 5 mol/liter, preferably in the range of from 0.01 to 1 mol/liter.

There is no particular limitation on a method of supplying hydrogen and oxygen, and hydrogen and oxygen may be directly blown into the solvent through a pipe or alternatively absorbed into the solvent from the gaseous phase. The mixing ratio of hydrogen to oxygen may be freely selected. However, the oxygen to hydrogen ratio (volume ratio) is advantageously 2 or more from the viewpoint of the selectivity of the reaction. The range of explosion of the mixed gas comprising hydrogen and oxygen is wide (hydrogen concentration: 4.7 to 93.9%), and the reaction is preferably carried out outside the range of explosion from the viewpoint of safety. However, it is, of course, possible to carry out the reaction also within the range of explosion. For example, a mixed gas comprising hydrogen and oxygen may be diluted with an inert gas, such as nitrogen, and the reaction may be carried out using the diluted mixed gas.

The amount of the platinum-group metal catalyst used in the process of the present invention is in the range of from 1 to 1000 ppm, preferably in the range of from 5 to 600 ppm, in terms of the proportion by weight of the platinum-group metal in the reaction medium. The particle diameter of the platinum-group metal catalyst is not particularly limited. However, when the reaction is carried out in a catalyst suspension flow system, the particle diameter is preferably in the range of from 1 to 1000 μm.

In the practice of the reaction, the pressure is not particularly limited and may range from atmospheric pressure to superatmospheric pressure. It is generally known that the reaction rate of this reaction is proportional to the partial pressure of hydrogen to some extent, so that the practice of the reaction under superatmospheric pressure is more advantageous. The temperature is usually in the range of from 0° to 30° C. When the freezing point of the solvent is 0° C. or less, it is also possible to carry out the reaction at a temperature of 0° C. or below.

The reaction can be practiced in a catalyst fix bed flow system, a catalyst suspension flow system, a batch system or the like. In some cases, it is possible to adopt a reaction system such as a trickle phase.

An acid-resistant material is adopted as a material for the reactor. Further, since hydrogen peroxide formed is easily decomposed by a very small amount of a heavy metal, such as iron or manganese, materials free from elution of the heavy metal are desired. More specifically, a reactor at least in its internal surface lined with titanium, teflon or the like can be suitably used.

The process of the present invention enables hydrogen peroxide to be produced in a high concentration catalytically from hydrogen and oxygen with a high selectivity, which renders the process of the present invention very useful from the viewpoint of industry.

EXAMPLE 1

(Preparation of Catalyst)

50 g of pentaethoxyniobium ($Nb(OC_2H_5)_5$) was dissolved in 50 ml of methanol, and the solution was added dropwise to 260 ml of water with stirring. The mixture was allowed to stand for 2 hr, and the resultant precipitate was filtered and dried at 110° C. for 5 hr to give 23 g of niobic acid. This product had a BET specific surface area of 300 $m^2/g$.

Palladium was carried on niobic acid as follows.

0.5 g of palladium chloride was dissolved in 1N hydrochloric acid, and 10.0 g of niobic acid prepared above was added thereto. The mixture was thoroughly stirred while heating to evaporate water, subjected to reduction with hydrogen at 200° C. for 3 hr and calcined at 500° C. for 2 hr under nitrogen to prepare a 3% palladium/niobium oxide (weight ratio of palladium to carrier) catalyst. The BET specific surface area of the catalyst after calcination was 10 $m^2/g$.

(Reaction Method)

200 ml of 0.2N hydrochloric acid was placed in a 500-ml four-necked flask equipped with a thermometer, a gas introduction tube and a stirring blade, and 700 mg of the 3% palladium/niobium oxide catalyst prepared above was added thereto under nitrogen. The mixture was cooled to 5° C., and a mixed gas comprising 3% of hydrogen, 47% of oxygen and 50% of nitrogen was passed through the mixture. After the initiation of the reaction, the concentration of hydrogen peroxide in the reaction mixture was determined at intervals of one hr with 1/40N potassium permanganate. The results were as follows (hydrogen peroxide: the accumulated concentration being expressed in ppm).

| Time | 1st hr | 2nd hr | 3rd hr | 4th hr | 5th hr |
| --- | --- | --- | --- | --- | --- |
| Hydrogen | 980 | 1860 | 2860 | 3720 | 4570 | peroxide

The accumulated concentration of hydrogen peroxide continued to increase linearly.

Comparative Example 1

The procedure of Example 1 was repeated to carry out a reaction, except that 5% palladium/activated carbon manufactured by company A was used. After the initiation of the reaction, the concentration of hydrogen peroxide in the reaction mixture was determined at intervals of one hr with 1/40N potassium permanganate. The results were as follows (hydrogen peroxide: the accumulated concentration being expressed in ppm).

| Time | 1st hr | 2nd hr | 3rd hr | 4th hr | 5th hr |
|---|---|---|---|---|---|
| Hydrogen peroxide | 600 | 720 | 720 | 730 | 740 |

The accumulated concentration of hydrogen peroxide did not increase after the 2nd hr of the reaction.

EXAMPLE 2

The procedure of Example 1 was repeated to prepare a catalyst, except that the calcination after palladium had been supported on the carrier was carried out at 500° C. under hydrogen. After the initiation of the reaction, the concentration of hydrogen peroxide in the reaction mixture was determined at intervals of one hr by titration with 1/40N potassium permanganate. The results were as follows (hydrogen peroxide: the accumulated concentration being expressed in ppm).

| Time | 1st hr | 2nd hr | 3rd hr | 4th hr | 5th hr |
|---|---|---|---|---|---|
| Hydrogen peroxide | 800 | 1650 | 2430 | 3250 | 3990 |

The accumulated concentration of hydrogen peroxide continued to increase linearly.

EXAMPLE 3

500 mg of the 3% palladium/niobium oxide catalyst prepared in Example 1 and 50 ml of 0.1N hydrochloric acid were placed in a titanium autoclave having an internal volume of 100 ml. Subsequently, a mixed gas comprising 3% of hydrogen, 47% of oxygen and 50% of nitrogen was introduced into the system to a total pressure of 50 kg/cm$^2$. The autoclave was cooled to 10° C., and the mixed gas was passed through the reaction system at a flow rate of 1000 cm$^3$/min for 3 hr while maintaining the temperature at 10° C. during the reaction. The reaction mixture was titrated with 1N potassium permanganate. As a result, the accumulated concentration of hydrogen peroxide was found to be 4.65%. The selectivity based on hydrogen was 95.3%. The selectivity based on hydrogen is the proportion of hydrogen used in the formation of hydrogen peroxide in the consumed hydrogen.

EXAMPLE 4

The procedure of Example 3 was repeated to carry out a reaction, except that the 3% palladium/niobium oxide catalyst prepared in Example 2 was used. As a result, the hydrogen peroxide concentration was 4.37%, and the selectivity based on hydrogen was 82.3%.

EXAMPLE 5

The procedure of Example 4 was repeated to carry out a reaction, except that the reaction pressure was 100 kg/cm$^2$. The hydrogen peroxide concentration was 7.90%, and the selectivity based on hydrogen was 75.1%.

EXAMPLE 6

The procedure of Example 5 was repeated to carry out a reaction, except that the flow rate of the mixed gas was 2000 cm$^3$/min. The hydrogen peroxide concentration was 9.75%, and the selectivity based on hydrogen was 76.2%.

EXAMPLE 7

The procedure of Example 6 was repeated to carry out a reaction, except that hydrogen gas was blown into the reaction mixture at a flow rate of 180 cm$^3$/min with an oxidgen gas supplied at a flow rate of 2300 cm$^3$/min into the autoclave in its gaseous phase.

The hydrogen peroxide concentration was 18.0%, and the selectivity based on hydrogen was 56.3%. The hydrogen concentration of the gaseous phase in the autoclave could be maintained at 3.2% which was outside the range of explosion, so that the reaction could be carried out safely.

EXAMPLE 8

(Preparation of Catalyst)

Niobic acid (BET surface area: 180 m$^2$/g) manufactured by Company B was calcined in air at 400° C. for 5 hr. The BET specific surface area after the calcination was 90 m$^2$/g. Niobium oxide which had been produced by the above calcination method was suspended in water and titrated with an alkali to determine the acid content of niobium oxide. As a result, the acid content was found to be 0.23 mmol/g. Palladium was supported on the niobium oxide as follows. 0.5 g of palladium chloride was dissolved in 1N hydrochloric acid, and 10.0 g of the niobium oxide prepared above was added to the resultant solution. The mixture was thoroughly stirred while heating to evaporate water and subjected to reduction with hydrogen at 200° C. for 3 hr to prepare a 3% palladium/niobium oxide (weight ratio of palladium to carrier) catalyst.

(Reaction Method)

200 ml of 0.2N hydrochloric acid was placed in a 500-ml four-necked flask equipped with a thermometer, a gas introduction tube and a stirring blade, and 700 mg of the 3% palladium/niobium oxide catalyst prepared above was added thereto under nitrogen. The mixture was cooled to 5° C., and a mixed gas comprising 3% of hydrogen, 47% of oxygen and 50% of nitrogen was passed through the mixture. After the initiation of the reaction, the concentration of hydrogen peroxide in the reaction mixture was determined at intervals of one hr with 1/40N potassium permanganate. The results were as follows (hydrogen peroxide: the accumulated concentration being expressed in ppm).

| Time | 1st hr | 2nd hr | 3rd hr | 4th hr | 5th hr |
|---|---|---|---|---|---|
| Hydrogen peroxide | 650 | 1320 | 1880 | 2330 | 2580 |

Comparative Example 2

The procedure of Example 8 was repeated to prepare a catalyst and to carry out a reaction, except that palladium was supported on niobic acid manufactured by Company B and subjected to the reduction treatment without the calcination of niobic acid in air. After the initiation of the reaction, the concentration of hydrogen peroxide in the reaction mixture was determined at intervals of one hr with 1/40N potassium permanganate. The results were as follows (hydrogen peroxide: the accumulated concentration being expressed in ppm).

| Time | 1st hr | 2nd hr | 3rd hr | 4th hr | 5th hr |
|---|---|---|---|---|---|
| Hydrogen peroxide | 410 | 750 | 1320 | 1530 | 1950 |

EXAMPLE 9

The procedure of Example 8 was repeated to prepare a catalyst and to carry out a reaction, except that the reduction treatment of palladium was carried out at 80° C. After the initiation of the reaction, the concentration of hydrogen peroxide in the reaction mixture was determined at intervals of one hr with 1/40N potassium permanganate. The results were as follows (hydrogen peroxide: the accumulated concentration being expressed in ppm).

| Time | 1st hr | 2nd hr | 3rd hr | 4th hr | 5th hr |
|---|---|---|---|---|---|
| Hydrogen peroxide | 490 | 950 | 1510 | 2100 | 2470 |

EXAMPLE 10

Platinum was supported on niobium oxide prepared as described in Example 8 as follows. 0.5 g of chloroplatinic acid hexahydrate was dissolved in 1N hydrochloric acid, and 6.0 g of niobium oxide was added thereto. The mixture was thoroughly stirred while heating to evaporate water and subjected to reduction with hydrogen at 200° C. for 3 hr to prepare a 3% platinum/niobium oxide (weight ratio of platinum to carrier) catalyst.

The procedure of Example 8 was repeated to carry out a reaction, except that the catalyst thus obtained was used. After the initiation of the reaction, the concentration of hydrogen peroxide in the reaction mixture was determined at intervals of one hr with 1/40N potassium permanganate. The results were as follows (hydrogen peroxide: the accumulated concentration being expressed in ppm).

| Time | 1st hr | 2nd hr | 3rd hr | 4th hr | 5th hr |
|---|---|---|---|---|---|
| Hydrogen peroxide | 350 | 710 | 1110 | 1440 | 1640 |

EXAMPLE 11

(Preparation of Catalyst)

5.0 g of niobium pentachloride and 21.0 g of silicon tetrachloride were dissolved in methanol, and 73.5 g of 28% aqueous ammonia was added to neutralize the solution. The precipitated oxide was collected by filtration. The collected solid matter was washed with methanol/water until no chloride ion was detected in the filtrate any more. Then, the washed solid matter was calcined in nitrogen at 400° C. for 2 hr and then at 500° C. for 2 hr in air, thereby preparing a niobium/silica mixed oxide. The BET specific surface area of the niobium/silica mixed oxide was 425 $m^2/g$.

Palladium was supported on the niobium/silica mixed oxide as follows. 1.0 g of palladium chloride was dissolved in 1N hydrochloric acid, and 10.0 g of the mixed oxide prepared above was added to the resultant solution. The mixture was thoroughly stirred while heating to evaporate water and subjected to reduction with hydrogen at 200° C. for 3 hr to prepare a 6% palladium/niobium/silica mixed oxide (weight ratio of palladium to carrier) catalyst.

(Reaction Method)

250 mg of the 6% palladium/niobium/silica mixed oxide catalyst as prepared above and 50 ml of 0.1N hydrochloric acid were placed in a titanium autoclave having an internal volume of 100 ml. Subsequently, a mixed gas comprising 3% of hydrogen, 47% of oxygen and 50% of nitrogen was introduced into the system to a total pressure of 50 $kg/cm^2$. The autoclave was cooled to 10° C., and the mixed gas was passed through the reaction system at a flow rate of 1000 $cm^3$/min for 3 hr while maintaining the temperature at 10° C. during the reaction. The reaction mixture was titrated with 1N potassium permanganate. As a result, the accumulated concentration of hydrogen peroxide was found to be 1.90%. The selectivity based on hydrogen was 85.3%.

EXAMPLE 12

(Preparation of Catalyst)

A catalyst was prepared by the ion-exchange method as follows. 30 g of niobic acid manufactured by Company B was immersed in a solution of 2.15 g of $[Pd(NH_3)_4]Cl_2$ dissolved in 30 ml of water. 3 hr after the initiation of immersion, the solid matter was collected by filtration and then thoroughly washed with water until no chloride ion was detected in the filtrate. The washed solid matter was dried at 110° C. for 20 hr to remove water, subjected to reduction with hydrogen at 200° C. for 3 hr and then calcined at 500° C. for 2 hr in nitrogen, thereby preparing a 3% palladium/ niobium oxide (weight ratio of palladium to carrier).

(Reaction Method)

The procedure of Example 5 was repeated to carry out a reaction. As a result, the accumulated concentration of hydrogen peroxide was 7.47%, and the selectivity based on hydrogen was 99.3%.

EXAMPLE 13

The procedure of Example 6 was repeated to carry out a reaction, except that 500 mg of the 3% palladium/niobium oxide catalyst prepared in Example 2 and a solution of 0.3 g of sodium chloride dissolved in 50 ml of 0.1N sulfuric acid were used. As a result, the accumulated concentration of hydrogen peroxide was 5.20%, and the selectivity based on hydrogen was 84.1%.

EXAMPLE 14

The procedure of Example 6 was repeated, except that 50 ml of 0.1N hydrobromic acid was used. As a result, the accumulated concentration of hydrogen peroxide was 7.72%, and the selectivity based on hydrogen was 98.2%.

EXAMPLE 15

The procedure of Example 6 was repeated, except that 500 mg of the 3% palladium/niobic acid catalyst prepared in Example 2 and a solution of 0.57 g of sodium bromide dissolved in 50 ml of 0.1N sulfuric acid were used. As a result, the accumulated concentration of hydrogen peroxide was 6.69%, and the selectivity based on hydrogen was 99.9%.

EXAMPLE 16

9.28 g of pentaethoxytantalum ($Ta(OC_2H_5)_5$) was added to a mixture of 100 ml of ethanol with 30 ml of water, and the mixture was then stirred at room temperature for one hr. The stirred mixture was concentrated to distill off the solvent, and the residue was dried at 110° C. for 5 hr to give 4.67 g of tantalic acid which had a BET specific surface area of 73.6 $m^2/g$.

Palladium was supported on the tantalic acid oxide as follows. 0.1 g of palladium chloride was dissolved in 1N hydrochloric acid, and 2.0 g of the tantalic acid prepared above was added to the resultant solution. The mixture was thoroughly stirred under nitrogen while heating to evaporate water, dried at 150° C. for 2 hr and subjected to reduction with hydrogen at 80° C. for 3 hr to prepare a 3% palladium/ tantalum oxide (weight ratio of palladium to carrier) catalyst.

The procedure of Example 3 was repeated to carry out a reaction, except that the 3% palladium/tantalum oxide catalyst prepared above was used. As a result, the hydrogen peroxide concentration was 3.90%, and the selectivity based on hydrogen was 75.4%.

EXAMPLE 17

0.5 g of palladium chloride was dissolved in 1N hydrochloric acid, and 10.0 g of molybdenum oxide was added to the resultant solution. The mixture was thoroughly stirred while heating to evaporate water. Then, the residue was subjected to reduction with hydrogen at 200° C. for 3 hr, thereby preparing a 3% palladium/molybdenum oxide (weight ratio of palladium to carrier) catalyst.

The procedure of Example 3 was repeated to carry out a reaction, except that the 3% palladium/molybdenum oxide catalyst prepared above was used. As a result, the hydrogen peroxide concentration was 4.10%, and the selectivity based on hydrogen was 83.0%.

EXAMPLE 18

0.5 g of palladium chloride was dissolved in 1N hydrochloric acid, and 10.0 g of tungsten oxide was added to the resultant solution. The mixture was thoroughly stirred while heating to evaporate water. Then, the residue was subjected to reduction with hydrogen at 200° C. for 3 hr, thereby preparing a 3% palladium/tungsten oxide (weight ratio of palladium to carrier) catalyst.

The procedure of Example 3 was repeated to carry out a reaction, except that the 3% palladium/tungsten oxide catalyst prepared above was used. As a result, the hydrogen peroxide concentration was 3.50%, and the selectivity based on hydrogen was 88.0%.

EXAMPLE 19

(Preparation of Catalyst)

6.6 g of tantalum pentachloride and 21.0 g of silicon tetrachloride were dissolved in methanol, and 73.5 g of 28% aqueous ammonia was added to neutralize the solution. The precipitated oxide was collected by filtration. The collected solid matter was washed with methanol/water until no chloride ion was detected in the filtrate any more. Then, the washed solid matter was calcined in nitrogen at 400° C. for 2 hr and then at 500° C. for 2 hr in air, thereby preparing a tantalum/silica mixed oxide. The BET specific surface area of the niobium/silica mixed oxide was 230 $m^2/g$.

Palladium was supported on the niobium/silica mixed oxide as follows. 1.0 g of palladium chloride was dissolved in 1N hydrochloric acid, and 10.0 g of the mixed oxide prepared above was added to the resultant solution. The mixture was thoroughly stirred while heating to evaporate water and subjected to reduction with hydrogen at 200° C. for 3 hr to prepare a 6% palladium/tantalum/silica mixed oxide (weight ratio of palladium to carrier) catalyst.

(Reaction Method)

250 mg of the 6% palladium/tantalum/silica mixed oxide catalyst as prepared above and 50 ml of 0.1N hydrochloric acid were placed in a titanium autoclave having an internal volume of 100 ml. Subsequently, a mixed gas comprising 3% of hydrogen, 47% of oxygen and 50% of nitrogen was introduced into the system to a total pressure of 50 kg/$cm^2$. The autoclave was cooled to 10° C., and the mixed gas was passed through the reaction system at a flow rate of 1000 $cm^3$/min for 3 hr while maintaining the temperature at 10° C. during the reaction. The reaction mixture was titrated with 1N potassium permanganate. As a result, the accumulated concentration of hydrogen peroxide was found to be 1.57%. The selectivity based on hydrogen was 83.4%.

INDUSTRIAL APPLICABILITY

The present invention is useful for the production of hydrogen peroxide, and the catalyst used in the present invention can provide a higher selectivity than the prior art catalysts, so that hydrogen peroxide having a high concentration can be produced.

We claim:

1. A process for producing hydrogen peroxide comprising the step of:

producing hydrogen peroxide catalytically from hydrogen and oxygen in a reaction medium in the presence of a platinum-group metal catalyst supported on an oxide carrier selected from the group consisting of a niobium oxide and a tantalum oxide, wherein the niobium oxide and tantalum oxide are prepared by heat treating niobic acid and tantalic acid, respectively, at a temperature of from 300° to 700° C.

2. The process according to claim 1, wherein said platinum-group metal catalyst is prepared by supporting a platinum-group metal on niobic acid or tantalic acid by an ion-exchange method and heat-treating the niobic acid or tantalic acid with the platinum-group metal supported thereon.

3. The process according to claim 1, wherein said niobium oxide and tantalum oxide and are in the form of respective dispersions thereof in other oxides.

4. The process according to claim 1, wherein said reaction medium is an aqueous medium containing a bromide anion or a chloride anion and a hydrogen ion.

5. The process according to claim 1, wherein said oxide carrier is niobium oxide.

* * * * *